United States Patent [19]

Guidoux

[11] Patent Number: 4,885,737
[45] Date of Patent: Dec. 5, 1989

[54] ECHO CANCELER HAVING SIMPLIFIED CALCULATION CIRCUITS

[75] Inventor: Loïc B. Y. Guidoux, La Queue lez Yvelines, France

[73] Assignee: Telecommunications Radioelectriques et Telephoniques T.R.T., Paris, France

[21] Appl. No.: 176,961

[22] Filed: Apr. 4, 1988

[30] Foreign Application Priority Data

Feb. 1, 1980 [FR] France .................. 80 02274

[51] Int. Cl.⁴ .................................. H04B 3/23
[52] U.S. Cl. ........................... 370/32.1; 379/411
[58] Field of Search ............ 370/32, 32.1; 375/58; 379/406, 410, 411

[56] References Cited

U.S. PATENT DOCUMENTS

| | | | |
|---|---|---|---|
| 4,087,654 | 5/1978 | Mueller | 379/411 |
| 4,117,277 | 9/1978 | Van Denelzen et al. | 379/406 |
| 4,162,378 | 7/1979 | Baudoux et al. | 379/411 |

Primary Examiner—Jin F. Ng
Assistant Examiner—Randall P. Myers
Attorney, Agent, or Firm—Thomas A. Briody; Jack E. Haken; Anne E. Barschall

[57] ABSTRACT

Echo canceler associated with a modem utilizing amplitude and phase modulation of a carrier, the echo canceler comprising adaptive filters (16-1) to (16-p) producing signals which are combined in an adder (15) for forming a synthetic echo signal $\epsilon(n)$. The coefficients of these filters are adjusted to minimize the mean square value of the residual echo signal $e(n) = \epsilon(n) - \hat\epsilon(n)$, where $\epsilon(n)$ is the echo received. The echo canceler comprises a code conversion circuit (17) which receives a signal $D(n)$ characterizing in each modulation interval the amplitude and phase state of the carrier to be transmitted and which produces distinct configurations of several numbers of values $+1$, $-1$ or $0$, said distinct configurations corresponding to the distinct possible states of the carrier to be transmitted such that elementary signals $D_1(n)$ to $D_p(n)$ are formed which are mutually independent in the mean and which are applied to the filters (16-1) to (16-p). These filters can then be realized in a simple way.

12 Claims, 4 Drawing Sheets

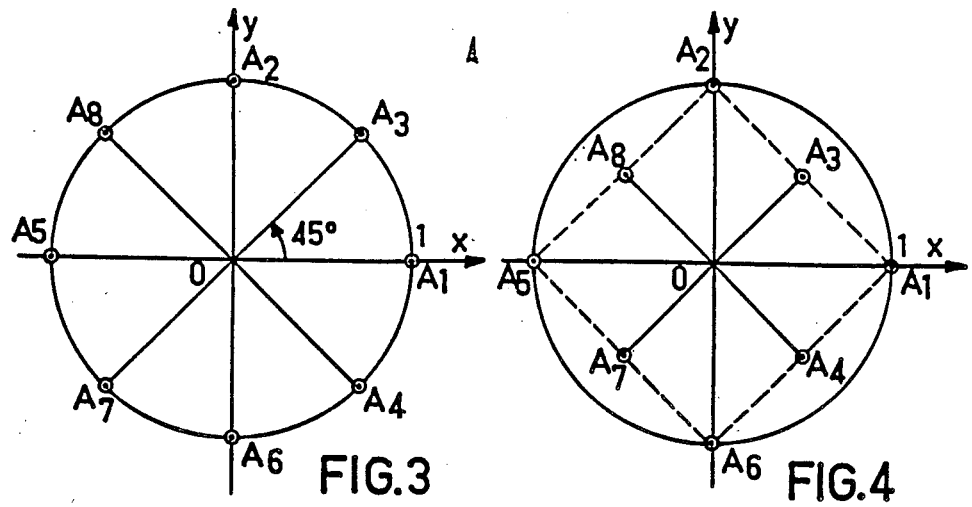
FIG.3
FIG.4
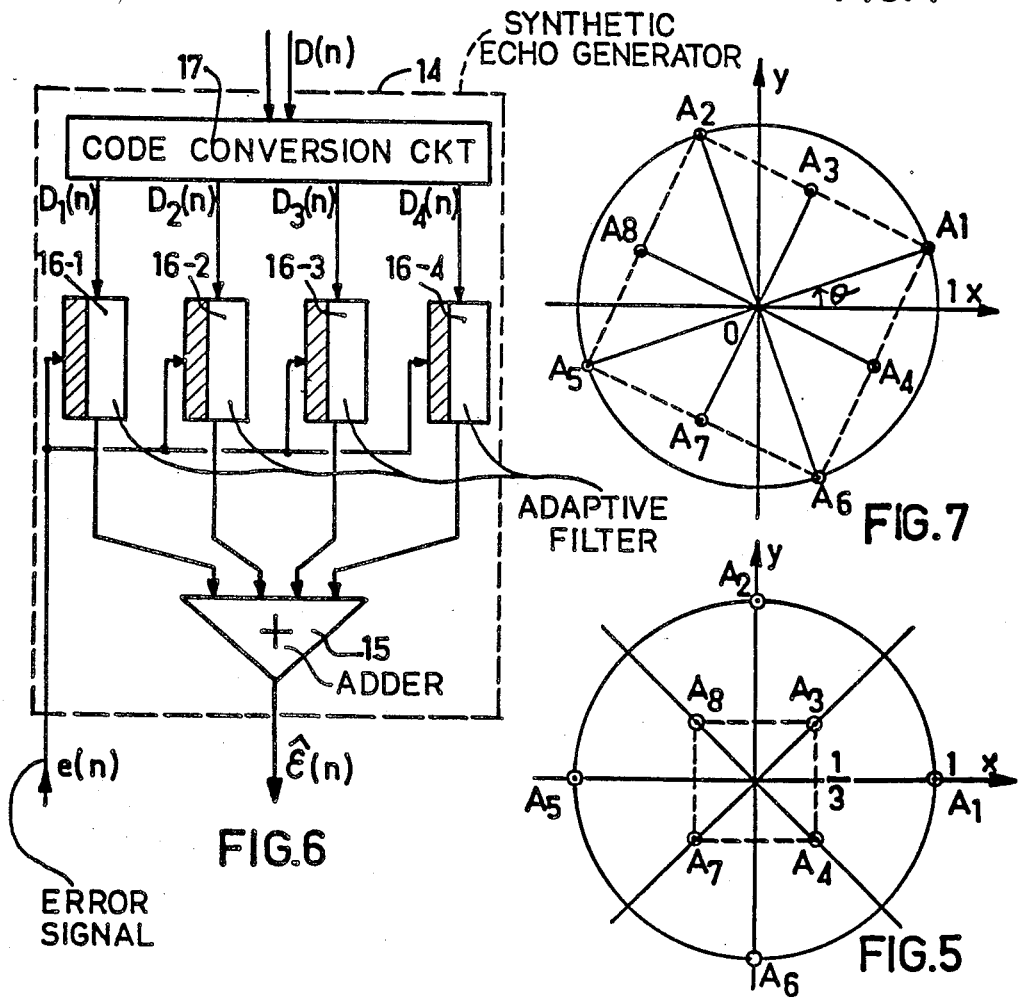
FIG.6
FIG.7
FIG.5

ECHO CANCELER HAVING SIMPLIFIED CALCULATION CIRCUITS

This is a division of application Ser. No. 704,897, filed, Feb. 22, 1985, now U.S. Pat. No. 4,785,445, which is a continuation of application Ser. No. 582,855, filed Feb. 24, 1984, which is a continuation of application Ser. No. 230,848, filed Feb. 2, 1981, both abandoned.

The invention relates to an echo canceler associated with a data transmission modem utilizing amplitude and phase modulation of a carrier, the echo canceler comprising adaptive filters receiving signals derived from the data signal to be transmitted and producing signals which are combined for forming a synthetic echo signal and whose coefficients are adjusted in an iterative manner to minimize, starting from the difference signal between the received signal and the synthetic echo signal, the mean square value of the residual echo signal present in said difference signal.

BACKGROUND OF THE INVENTION

It is known, that when coupling a modem to a two-wire transmission line a fraction of the signal transmitted by the transmit path may occur inopportunely in the receive path of this modem owing to imperfections in the hybrid coupler coupling the modem to the transmission line or owing to reflections in this transmission line. An echo canceler has for its object to cancel this unwanted signal or echo signal appearing in the receive path. Canceling the echo has the advantage of permitting a full-duplex transmission between the modems interconnected by means of a two-wire transmission line.

An echo canceler of the above-described type is disclosed in U.S. Pat. No. 4,162,378. In accordance with this prior art technique, an echo canceler comprises in principle the same number of adaptive digital filters as there are distinct phase states of the transmitted carrier, each adaptive filter being assigned to a predetermined phase state. In each modulation interval, a number corresponding with the amplitude of the transmitted carrier is applied to an adaptive filter corresponding with the phase of the transmitted carrier, while the number 0 is applied to all other filters. In the majority of the customary modulation methods, one half of the phases of the transmitted carrier differs an amount of 180° from the other half of the phases and the number of adaptive filters can be divided by two, each filter then being assigned to a phase state $\Psi$ and $\Psi+180°$ of the transmitted carrier, while the numbers corresponding with the amplitude of the carrier and assigned to each filter are provided in similar manner with a "+" sign or a "−" sign.

When this known technique is used, the adaptive digital filters can only be realized in a simple way in the case of phase modulation without amplitude modulation. Then the numbers applied to the input of the filter can be reduced to the values $+1$, $-1$ or 0 and the circuits used in the filters for multiplication by these numbers can be reduced to very simple logic circuits. In contrast therewith, when the carrier is amplitude-modulated as well as phasemodulated the adaptive digital filters must be realized in a more complex manner, particularly if the amplitude levels of the carrier have mutually "complicated" ratios such as $\frac{1}{3}$ or $\sqrt{2}$, which is often the case. The digital filters must then be provided with calculation circuits for performing multiplications by these "complicated" numbers.

OBJECT OF THE INVENTION

The present invention has for its object to provide an echo canceler in which, irrespective of the type of modulation considered, the adaptive digital filters only process signals having values $+1$, $-1$ or 0, so that these filters can be implemented in an identical manner with very simple calculation circuits.

SUMMARY OF THE INVENTION

The echo canceler of the invention is characterized in that it comprises code conversion means which receive a signal characterizing in each modulation interval the amplitude and phase state of the carrier to be transmitted and which produce distinct configurations of several numbers of values $+1$, $-1$ or 0, said distinct configurations corresponding with the distinct possible states of the carrier to be transmitted so as to form several elementary signals which are mutually independent in the mean, these elementary signals being applied to the respective adaptive filters.

In practical modulation cases the possible states of the carrier can be combined to pairs in which two states correspond with the same amplitude and with two phases which differ by an amount of 180°. In this case it is advantageous to arrange the code conversion means of the echo canceler to produce for each pair of states of the carrier two number configurations which only differ as to their sign. The required number of adaptive digital filters is then divided by two.

In the echo canceler of the invention all adaptive digital filters process elementary signals formed by the simple numbers $+1$, $-1$ or 0. Preferably, these filters are identical to a base filter in which the circuit for multiplication by these numbers $+1$, $-1$ or 0 can be realized in a very simple manner. Starting from such a base filter it is then possible to realize the echo canceler of the invention as a modular circuit.

In addition, without any modification, an echo canceler of the invention can be automatically adapted to different modulation types using the same number of modulation states. Finally, by changing the branching of the adaptive digital filters the echo canceler can easily be adapted to functioning of the modem at a normal rate and at a fall-back rate, with the advantage of increased performance of the echo canceler at the fall-back rate.

BRIEF DESCRIPTION OF THE DRAWINGS

Embodiments of the echo canceler of the invention and their advantages will now be further described by way of non-limitative example with reference to the accompanying drawings, in which:

FIGS. 3, 4, 5 and 7 are signal space diagrams for several modulation types having 8 amplitude and phase states;

FIG. 6 shows an embodiment of the generator for the synthetic echo signal in the case of 8-state modulation;

DETAILED DESCRIPTION OF THE PREFERRED EMBODIMENT

Figure 1:
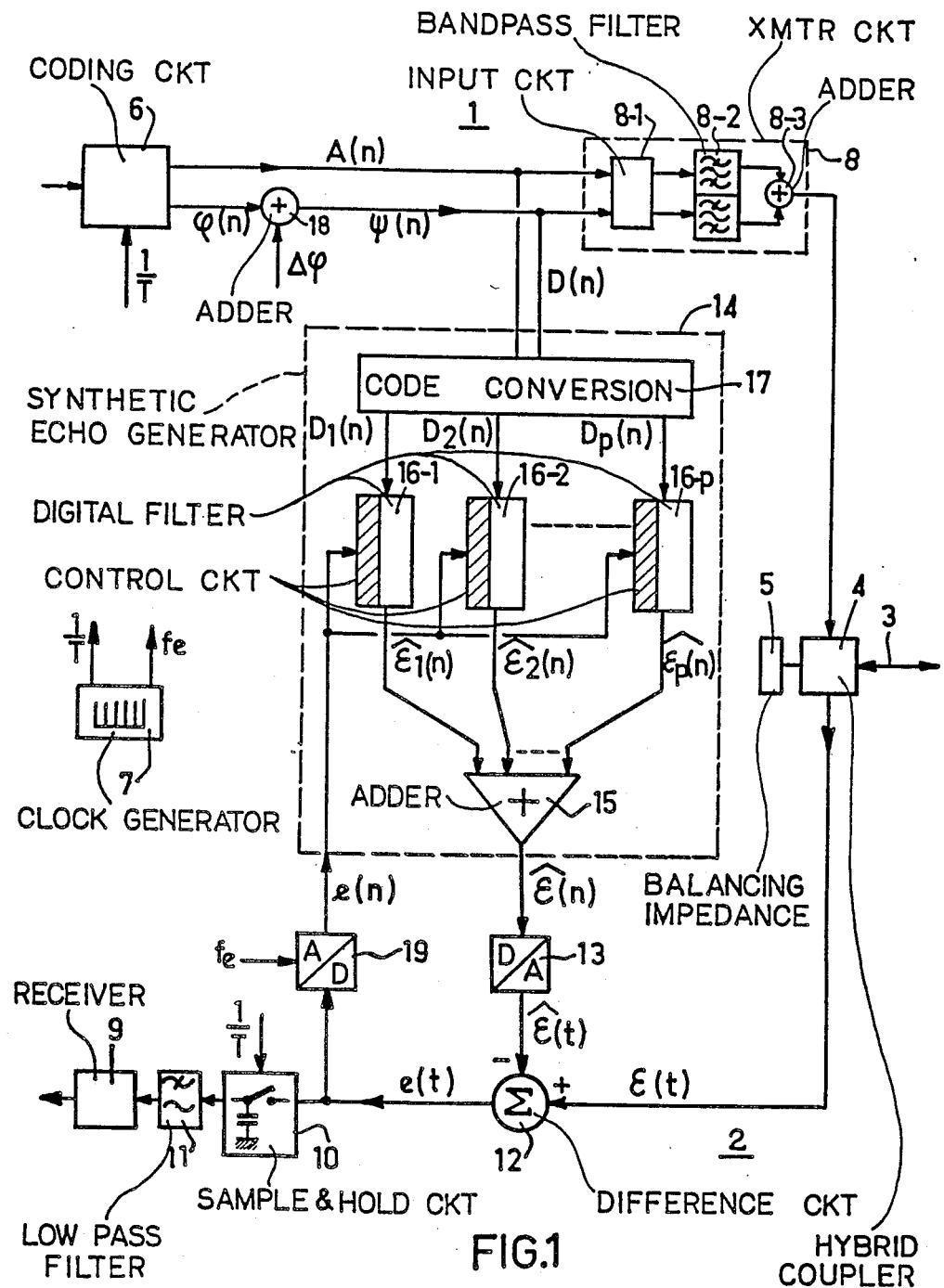
FIG. 1 shows the general structure of the echo canceler of the invention.

FIG. 1 shows the general structure of the echo canceler of the invention associated with a modem in which the data are transmitted by phase and amplitude modulation of a carrier. This modem comprises a transmit path 1 and a receive path 2, which are connected to a two-way transmission line 3 via a hybrid coupler 4 to which also a balancing impedance 5 is connected.

Let it be assumed, by way of example, that for transmitting data the transmit path utilizes a digital type of modulation of the "echo modulation" type described in the article by Croisier and Pierret, entitled "The digital echo modulation", published in IEEE Trans. Comm., Vol. COM-18 No. 4, Aug. 1970, pages 367–376. For the simplified form shown in FIG. 1, the transmit path 1 then includes a coding circuit 6, which receives the data to be transmitted and produces a pair of signals which are representative of the amplitude $A(n)$ and phase changes $\phi(n)$ assigned to the carrier as a function of the data at instants nT, which are determined by a generator 7 for the clock frequency $1/T$. In order to allow for the phase variation $\Delta\phi$ of the (unmodulated) carrier during each modulation interval T, an adder 18 is provided for producing at each instant nT the sum $\phi(n) + \Delta\phi$ which is representative of the absolute phase $\Psi(n)$ of the modulated carrier to be transmitted. Let it be assumed that the possible absolute phases $\Psi(n)$ mutually differ by a submultiple of 360°, which is often the case. The two signals representative of the amplitude $A(n)$ and the absolute phase $\Psi(n)$ form together a signal which fully characterizes the amplitude and phase state of the carrier to be transmitted at the instants nT. This signal is applied to a transmitter circuit 8, which forms the analog modulated carrier signal and has at its input a circuit 8-1 forming the real component $A(n) \cos \Psi(n)$ and the imaginary component $A(n) \sin \Psi(n)$ of the complex signal with modulus $A(n)$ and argument $\Psi(n)$. These two components together also fully characterize the amplitude and phase state of the carrier to be transmitted at the instants nT. They are applied to the bandpass filters 8-2, whose output signals are added in an adder 8-3 to form the analog modulated carrier signal which is applied to the transmit port of the hybrid coupler 4.

The receive path 2 of the modem is connected to a receiver 9 via a regenerator formed by a sample-and-hold circuit 10 activated in the rhythm of the clock frequency $1/T$ and a lowpass filter 11. At full duplex operation of the two modems connected to the ends of the transmission line 3, the receiver 9 should only receive signals transmitted by the other (remote) modem. Owing to imperfections in the balancing of the hybrid coupler 4 and reflections in the transmission line 3, the receiver 9 may however also receive a parasitic signal $\epsilon(t)$, denoted echo signal and originating from the modulated signal produced by the transmitter circuit 8.

In order to cancel this echo signal, use is made of an echo canceler comprising a difference circuit 12, which receives the signal appearing at the receive port of the hybrid coupler 4 and also a synthetic echo signal $\hat{\epsilon}(t)$. As regards functioning of the echo canceler, it may be assumed that only the transmitter circuit 8 transmits so that the signal coming from the hybrid coupler 4 and applied to the difference circuit 12 is the echo signal $\epsilon(t)$. The difference signal $e(t) = \epsilon(t) - \hat{\epsilon}(t)$ produced by the difference circuit 12 is then the residual echo signal. This assumption, which simplifies the line of argument and the calculations, will be used as the starting point for the following description.

The synthetic echo signal $\hat{\epsilon}(t)$ is available in analog form at the output of a digital-to-analog converter 13. It is generated in digital form by a synthetic echo signal generator 14, which receives a signal $D(n)$ characterizing the phase and amplitude state of the carrier to be transmitted at the instants nT. From the above exposition it follows that this signal $D(n)$ may be constituted, as shown in FIG. 1, by the assembly of the two signals representative of the amplitude $A(n)$ and the absolute phase $\Psi(n)$ of the carrier to be transmitted. Alternatively, this signal $D(n)$ might be constituted by the two components $A(n) \cos \Psi(n)$ and $A(n) \sin \Psi(n)$ formed at the output of the circuit 8-1. Finally it should be noted that in case no signals characterizing the amplitude and the absolute phase of the carrier to be transmitted would be available in the transmit path 1 of the modem, it would always be possible to incorporate circuits in the echo canceler which derive these signals from the actual data to be transmitted.

The synthetic echo signal generator 14 comprises a code conversion circuit 17 which causes p-samples of signals $D_1(n)$, $D_2(n)$, . . . , $D_p(n)$ to correspond with each sample of the signal $D(n)$ at the instants nT. These p signals are processed in p adaptive digital filters 16-1, 16-2, . . . 16-p, respectively. The output signals of these filters are added by means of an adder 15, which produces the synthetic echo signal $\hat{\epsilon}(n)$ in digital form.

The adaptive digital filters 16-1 to 16-p include control circuits (represented by the hatched zones) which adjust the filter coefficients. These control circuits are controlled by the digital signal produced by an analog-to-digital converter 19 in which the residual echo signal $e(t)$ at the output of difference circuit 12 is sampled and coded. This sampling is performed at the frequency $f_e$ generated by the clock generator 7 and having such a multiple of the frequency $1/T$ that the Shannon-theorem is satisfied as regards the residual echo signal $e(t)$. The instants $t_e$ at which this sampling is performed are associated with the sampling instants nT of the signal $T(n)$ by the relation $t_e = nT + r\,T/M$, where M is a fixed integer, for example equal to 6, and r is an integer varying between 0 and M-1. To simplify the description and the calculations the variable r will no longer occur and it will therefore be assumed that a fixed value has been assigned to this variable, but it will be obvious that the indicated calculations must be performed for the M values the variable r may assume. Likewise, in the digital residual echo signal produced by the converter 19 only those samples are considered which occur at instants defined by the variable n, the variable r being fixed, and this digital signal will be denoted by $e(n)$. Likewise, in the digital synthetic echo signal produced by the generator 14 only the samples occurring at instants defined by the variable n are considered, this digital signal being denoted by $\epsilon(n)$. Finally, the values of the echo signal $\hat{\epsilon}(t)$ will be considered at the same instants, these values being denoted by $\epsilon(n)$.

The control circuits included in the filters 16-1 to 16-p control the coefficients of these filters in an iterative manner in order to minimize the mean square value of the residual echo signal. This residual echo signal constitutes the error signal of the echo canceler control loop and will often be referred to as error signal hereinafter. After a certain number of successive iterations the residual echo signal at the output of the difference circuit 12 is substantially eliminated and during full duplex operation of the two modems connected to the ends of the transmission line 3 the receiver 9 receives only signals originating from the remote modem.

In accordance with the above-mentioned prior art (U.S. Pat. No. 4,162,378) the number p of the adaptive filters is generally equal to half the possible absolute phases of the modulated carrier, each filter being assigned to a pair of possible absolute phases which differ by an amount of 180°. Then the code conversion circuit 17 is equivalent to a routing circuit which at each instant nT applies a number representative of the amplitude A(n) to a given filter corresponding with the absolute phase Ψ (n) and the number 0 to all other filters. But in the case of modulation with different amplitude levels having mutually "complicated" ratios such as ⅓ or $\sqrt{2}$, the numbers unequal to zero and applied to the filters are "complicated" numbers corresponding with these ratios. In order to obtain the required accuracy in the echo canceler, the "complicated" numbers must be represented by at least 8 bits and the filters coefficients by at least 12 bits, so that in the filters the multiplications of the input numbers by the coefficients are complicated and costly operations. In the best possible solution described in the above-mentioned U.S. Pat. these multiplications must be performed once in each sampling period T.

The present invention provides an echo canceler in which, on the contrary, due to a suitable code conversion circuit 17, the signals $D_1(n)$ to $D_p(n)$ applied to the adaptive digital filters contain only the numbers +1, −1 or 0 so that these filters can be realized in a simple and, for all filters identical, way. In addition, the same echo canceler can be used for several types of modulation. Finally, several types of code conversion are possible, which may lead to several embodiments as regards the number of digital filters.

The theoretical bases of the invention will now be described for the general case. The calculations to be performed in any arbitrary generator 14 to obtain a synthetic echo signal $\hat{\epsilon}$ (n) starting from a signal D(n), will be formulated first. The generator 14 acts as a transversal filter which, as known, includes means to store at an instant nT characterized by an integer n, both N consecutive input samples D(n), d(n−1) ... D(n−N+1) and N coefficients $C_0(n)$, $C_1(n)$ ... $C_{N-1}(n)$.

To simplify the description a vectorial notation can be used and the N samples stored in the filter at an instant n may be considered as the components of a vector D(n) so that:

$$D(n) = \begin{bmatrix} D(n) \\ D(n-1) \\ \cdot \\ \cdot \\ D(n-N+1) \end{bmatrix}$$

Likewise, the N coefficients stored in the filter at an instant n may be considered as the components of a vector C(n) so that:

$$C(n) = \begin{bmatrix} C_0(n) \\ C_1(n) \\ \cdot \\ \cdot \\ C_{N-1}(n) \end{bmatrix}$$

The transpose $\underline{D}(n)$ of the vector $\vec{D}(n)$ is written:

$$\underline{D}(n) = [D(n)\ D(n-1)\ D(n-N+1)]$$

The convolution operation performed in the generator 14 acting as transversal filter to produce each sample of the synthetic echo signal $\hat{\epsilon}$ (n) can then be written:

$$\hat{\epsilon}(n) = \underline{D}(n).\vec{C}(n) \tag{1}$$

On the other hand, it is known that when using the gradient algorithm to minimize the mean square value of the error signal e(t), the coefficients of the transversal filter constituting the generator 14 must be controlled in an iterative manner by using a recursion formula which in vectorial notation can be written as follows:

$$\vec{C}(n+1) = \vec{C}(n) + \beta.E[e(n).\vec{D}(n)] \tag{2}$$

In this connection reference is made to, for example, an article by Mueller published in IEEE Trans. Comm., Vol COM-24, No. 9, Sep. 1976, pages 956–962.

In the formula (2), the vector $\vec{C}(n+1)$ represents the coefficients of the filter at the instant (n+1), β is a constant coefficient less than 1 and E is an operator indicating the mean value (or mathematical expectation of the subsequent quantity between brackets, this mean value being taken at the instant characterized by n.

In practice, the recursion formula (2) is replaced by the following simpler recursion formula which avoids the calculation of a mean value:

$$\vec{C}(n+1) = \vec{C}(n) + \alpha.e(n).\vec{D}(n) \tag{3}$$

where α is a coefficient very small with respect to 1 and determining the value of the modification in the coefficients at each iteration.

If h(t) is the impulse response of the path of the echo signal ε (t), this path including the transmitter circuit 8 with its filter 8-2, it is also possible to define a vector $\vec{h}(n)$, which has as components the values of this impulse response at the instants n, n−1, ..., n−N+1. The echo signal ε (n) at the instant n can then be written in a manner which corresponds to the formula (1):

$$\epsilon(n) = \underline{D}(n).\vec{h}(n) \tag{4}$$

The present invention is based on the idea that the vector $\vec{D}(n)$ can be resolved into p elementary vectors $\vec{D}_1(n)$, $\vec{D}_2(n)$, ... $\vec{D}_p(n)$ by putting two conditions, namely a first condition that the components of the elementary vectors only assume the values +1, −1 or 0 and the second condition that these vectors are mutually independent in the mean.

If $\vec{D}_i(n)$, $\vec{D}_{i'}(n)$ are two elementary vectors (where i and i' are integers between 1 and p) and $D_i(n-q)$, $D_{i'}(n-q')$ are the N components of these vectors (where q and q' are integers between 0 and N−1), the condition of independence in the mean implies that the elementary vectors have components such that for $i \neq i'$ the following relation holds:

$$E[D_i(n-q).D_{i'}(n-q')]=0 \qquad (5)$$

The independence of the p elementary vectors can be expressed in a more simpler way by the condition for $i \neq i'$ that:

$$E[D_i(n).D_{i'}(n)]=0 \qquad (5A)$$

This condition (5A) expresses the independence in the mean between the two different elementary signals $D_i(n)$ and $D_{i'}(n)$.

The resolution of the vector D(n) into p elementary vectors can be expressed by the formula:

$$\vec{D}(n) = k_1 \vec{D}_1(n) + k_2 \vec{D}_2(n) + + k_p \vec{D}_p(n) \qquad (6)$$

In this equation the factors $k_1, k_2, \ldots k_p$ are generally complex.

The invention consists in replacing the signal D(n), with the aid of the code conversion circuit 17, by p elementary digital signals $D_1(n)$ to $D_p(n)$ which can only assume the values +1, −1 of 0 and which satisfy the independence condition expressed by the formula (5A). According to the invention, instead of using for generator 14 an adaptive signal filter producing the synthetic echo signal $\hat{\epsilon}(n)$ by performing the calculations described in the expressions (1) and (2), the adaptive digital filters 16-1 to 16-p are used which process the signals $D_1(n)$ to $D_p(n)$ provided by the code conversion circuit 17. These filters use groups of N coefficients which can be represented in vectorial notation by the vectors $\vec{C}^1(n)$ to $\vec{C}^p(n)$. They supply signals $\hat{\epsilon}_1(n)$ to $\epsilon_p(n)$ which are calculated in a manner which is similar to the expression (1):

$$\hat{\epsilon}_1(n) = D_1(n) \cdot C^1(n) \qquad (7)$$
$$\hat{\epsilon}_2(n) = D_2(n) \cdot C^2(n)$$
$$\vdots$$
$$\hat{\epsilon}_p(n) = D_p(n) \cdot C^p(n)$$

In principle, the coefficients of these filters are controlled in accordance with the recursion formulae which correspond with formula (2):

$$C^1(n+1) = C^1(n) + \beta E[e(n) \cdot D_1(n)] \qquad (8)$$
$$C^2(n+1) = C^2(n) + \beta E[e(n) \cdot D_2(n)]$$
$$\vdots$$
$$C^p(n+1) = C^p(n) + \beta E[e(n) \cdot D_p(n)]$$

In practice, the coefficients are controlled in accordance with the simpler recursion formulae which are similar to formula (3):

$$C^1(n+1) = C^1(n) + \alpha \cdot e(n) \cdot D_1(n) \qquad (9)$$
$$C^2(n+1) = C^2(n) + \alpha \cdot e(n) \cdot D_2(n)$$
$$\vdots$$
$$C^p(n+1) = C^p(n) + \alpha \cdot e(n) \cdot D_p(n)$$

The digital synthetic echo signal $\hat{\epsilon}(n)$ is the sum of the output signals of the filters:

$$\hat{\epsilon}(n) = \hat{\epsilon}_1(n) + \hat{\epsilon}_2(n) + + \hat{\epsilon}_p(n) \qquad (10)$$

It will now be demonstrated that, acting thus, the error signal $e(n) = \epsilon(n) - \hat{\epsilon}(n)$ tends to zero which corresponds, in practice, to cancelling the residual echo signal e(t) at the output of the difference circuit 12.

By taking account of formula (7), the synthetic echo signals defined by formula (10) can be written:

$$\hat{\epsilon}(n) = \vec{D}_1(n)\vec{C}^1(n) + \vec{D}_2(n)\vec{C}^2(n) + + \vec{D}_p(n) C^p(n)$$

On the other hand, by taking account of formula (6) for the resolution of the vector $\vec{D}(n)$, the echo signal $\epsilon(n)$ defined by formula (4) can be written:

$$\epsilon(n) = D_1(n).k_1.\vec{h}(n)$$
$$+ D_2(n).k_2.\vec{h}(n) + + D_p(n).k_p.\vec{h}(n)$$

From this it follows that the error signal e(n) in the present concept of the echo canceler is written:

$$e(n) = D_1(n)[k_1 \cdot h(n) - C^1(n)] + D_2(n) \qquad (11)$$
$$[k_2 \cdot h(n) - C^2(n)] + \ldots$$
$$\ldots + D_p(n)[k_p \cdot h(n) - C^p(n)]$$

In accordance with formulae (8), the modifying terms of the coefficients at each iteration have the following form for the filters 16-1 to 16-p:

$$\begin{cases} \Delta_1 = \beta \cdot E[e(n) D_1(n)] \\ \Delta_2 = \beta \cdot E[e(n) D_2(n)] \\ \vdots \\ \Delta_p = \beta \cdot E[e(n) D_p(n)] \end{cases} \qquad (12)$$

By replacing e(n) by its development given in formula (11), the term $\Delta_1$ can, for example, be written:

$$\Delta_1 = \beta \cdot [k_1 h(n) - C^1(n)] \cdot E[D_1(n) \cdot D_1(n)] \qquad (13)$$
$$+ \beta \cdot [k_2 h(n) - C^2(n)] \cdot E[D_1(n) \cdot D_2(n)]$$
$$\vdots$$
$$+ \beta \cdot [k_p h(n) - C^p(n)] \cdot E[D_1(n) \cdot D_p(n)]$$

It will be obvious that in drafting this expression for $\Delta_1$ the fact that the terms of the factors $[k_1\vec{h}(n) - \vec{C}^1(n)]$ to $[k_p\vec{h}(n) - \vec{C}^p(n)]$ are not random terms is taken into account, so that it is permitted not to apply the operator E to these factors.

To form the first term of the formula (13) for $\Delta_1$ the expression $E[\vec{D}_1(n).D_1(n)]$ must be calculated, which expression can be written in matrix form as:

$$\begin{bmatrix} D_1(n) \cdot D_1(n) & D_1(n) \cdot D_1(n-1) & \ldots & D_1(n) \cdot D_1(n-N+1) \\ D_1(n-1) \cdot D_1(n) & D_1(n-1) \cdot D_1(n-1) & \ldots & D_1(n-1) \cdot D_1(n-N+1) \\ \vdots & & & \\ D_1(n-N+1) \cdot D_1(n) & D_1(n-N+1) \cdot D_1(n-1) & \ldots & D_1(n-N+1) \cdot D_1(n-N+1) \end{bmatrix} \quad (14)$$

By applying the operator E to all terms of the matrix of expression (14), a matrix is obtained whose terms are all zero except those on the diagonal. The fact is that all terms other than those on the diagonal are products of two necessarily random numbers (such as the data to be transmitted) whose possible values +1, −1 and 0 are equiprobable.

Finally, expression (14) is a diagonal matrix whose respective terms are:

$$E[(D_1(n))^2], E[(D_1(n-1))^2], E[(D_1(n-N+1))^2]$$

These terms are equal to a same constant $\sigma$ which represents a signal power. Thus the expression (14) is the product of a constant $\sigma$ and the identity matrix and consequently equal to the constant $\sigma$.

To form the second term of the formula (13) for $\Delta_1$ the expression $E[(\vec{D}_1-n).\vec{D}_2(n)]$ must be calculated. Now, this expression is a matrix whose terms can be expressed by the formula $E[(D_1(n-1).D_2(n-q')]$, where q and q' assume all integral values between 0 and N−1. In accordance with formula (5) expressing the independence of the elementary vectors for resolving the vector D(n), all terms of this matrix are zero resulting in that the second term of the formula (13) is zero. In a similar manner it can be demonstrated that all the subsequent terms of the formula (13) are also zero.

Finally, it follows from the foregoing that the modifying term $\Delta_1$ of the coefficients $\vec{C}^1(n)$ is written as:

$$\Delta_1 = \beta[k_1\vec{h}(n) - \vec{C}^1(n)].\sigma$$

So the first formula of the recursion formulae (8) can then be written as:

$$\vec{C}^1(n+1) = \vec{C}^1(n)[1-\beta\sigma] + \beta\sigma k_2 h(n) \quad (15)$$

This recursion formula has a classical shape of the type $\vec{C}(n+1) = \vec{C}(n).\lambda + \mu$ of which it is known that when n goes to infinity, C(n) can be written in the form $$\lambda^n + \frac{\mu}{1-\lambda}.$$

By applying this result to formula (15) it can be written for n increasing to infinity:

$$C_1(n) = [1-\beta\sigma]^n + \frac{\beta\sigma}{1-[1-\beta\sigma]} \cdot k_1 h(n)$$

As $\beta < 1$, also $(1-\beta\sigma) < 1$ and the limit of $C_1(n)$ for n increasing to infinity is $k_1 h(n)$.

Similar calculations can be performed for the other recursion formulae (8) and finally it can be demonstrated that, after a sufficiently large number of iterations, in the echo canceler of the invention the coefficients of the filters 16-1 to 16-p practically adjust themselves in a manner such that:

$$\begin{cases} C^1(n) = k_1 h(n) \\ C^2(n) = k_2 h(n) \\ \vdots \\ C^p(n) = k_p h(n) \end{cases} \quad (16)$$

When the coefficients $\vec{C}^1(n)$ to $\vec{C}^p(n)$ reach the values given by the formulae (16) and corresponding to the convergence of the echo canceler, the error signal e(n) is zero, as can be verified in formula (11), and consequently the residual echo signal e(t) is zero.

The operation of the echo canceler of the invention can then be interpreted as follows. In this echo canceler comprising as many filters 16-1 to 16-p as necessary for processing the signals $D_1(n)$ to $D_p(n)$ having values +1, −1 or 0 and being independent in the mean, a multiplication (or modulation) of these signals $D_1(n)$ to $D_p(n)$ by the respective factors $k_1$ to $k_p$ is now automatically reached, owing to the algorithm used to modify the coefficients of these filters, so that the sum of the multiplied (or modulated) signals is equal to the original signal D(n).

It should here be noted that the condition of independence in the mean for the elementary signals $D_1(n)$ to $D_p(n)$ as expressed by formula (5A) must of necessity be observed if it holds at any instant n, for $i \neq i'$, that:

$$D_i(n).D_{i'}(n) = 0 \quad (17)$$

Observing this condition, which indicates an instantaneous independence of the elementary signals $D_1(n)$ to $D_p(n)$, is achieved by means of a code conversion circuit 17 producing at any instant n, irrespective of the modulation state of the carrier, a signal non zero elementary signal equal to +1 or −1.

The independence of the elementary signals $D_1(n)$ to $D_p(n)$ will only be satisfied in the mean, when the code conversion circuit 17 is arranged to produce distinct configurations of the values +1, −1 or 0 of the elementary signals which distinct configurations correspond to the distinct states of the carrier in a manner such that upon forming all possible products of two of these values in each configuration the sum of all possible products for all configurations is zero. As the modulation states of the carrier are equiprobable, the condition (5A) which expresses the independence in the mean for the elementary signals is then satisfied in the proper way.

As will appear from the examples described hereinafter relating to different carrier modulation methods, a first type of embodiment of the echo canceler of the invention corresponds to an instantaneous independence of the elementary signals. In this type of embodiment, a rapid convergence of the echo canceler is often obtained at the cost of a larger number of filters. In a second type of embodiment, only an independence in the mean for the elementary signals is obtained and the convergence of the echo canceller is consequently slower, but the required number of filters is often less.

As mentioned above, the factors $k_1$ to $k_p$ figuring in the resolution of the signal $D(n)$ are generally complex numbers and from formulae (16) it then follows that the coefficients $\vec{C}^1(n)$ to $\vec{C}^p(n)$ are of necessity complex numbers. This means that, apart from the signals $D_1(n)$ to $D_p(n)$ which have real values $+1$, $-1$ or 0, all signals used in the foregoing demonstration are formed by complex numbers. Thus in the echo canceler each filter 16-1 to 16-p must in principle comprise two filters, one filter operating with the real part $\vec{C}_R^1(n)$ to $\vec{C}_R^p(n)$ of the coefficients, the other filter operating with the imaginary part $\vec{C}_I^1(n)$ to $\vec{C}_I^p(n)$. This results in a synthetic echo signal $\hat{\epsilon}(n)$ which has a real part $\hat{\epsilon}_R(n)$ and an imaginary part $\hat{\epsilon}_I(n)$. In order to derive a complex echo signal $\epsilon(n)$ from the signal coming from the hybrid coupler 4 and being the real part $\epsilon_R(n)$ of this complex signal, a 90° phase shifter (not shown) producing the imaginary part $\epsilon_I(n)$ may be used in known manner. Starting from the complex error signal $e(n)$ produced by the difference circuit 12, the coefficients of each of the two filters together constituting the filters 16-1 to 16-p can be controlled separately.

Actually, it is not efficient to have the echo canceler operate with complex signals for cancelling the real echo signal $\epsilon_R(n)$ coming from the hybrid coupler 4, since that would result, as described above, in using of pairs of filters in the filters 16-1 to 16-p.

Let it now indeed be assumed that these filters 16-1 to 16-p are each formed by one single filter and that they have coefficients which are the respective real parts $\vec{C}_R^1(n)$ to $\vec{C}_R^p(n)$ of the complex coefficients. Then the synthetic echo signal is a real signal $\epsilon_R(n)$ and it is easy to show that the real error signal $\hat{e}_R(n) = \epsilon_R(n) - \hat{\epsilon}_R(n)$ can be written in a manner corresponding with formula (11) as:

$$e_R(n) = D_1(n)\{IRe[k_1 \cdot \vec{h}(n)] - \vec{C}_R^1(n)\} + \cdots + D_p(n-)\{IRe[k_p \cdot \vec{h}(n)] - \vec{C}_R^p(n)\} \quad (18)$$

It should be noted that in this formula (18), $k_1$ to $k_p$ and $h(n)$ may be complex numbers.

On the other hand, it can be shown in the same way as in the foregoing that, by controlling the coefficients $C_R^1(n)$ to $C_R^p(n)$ in accordance with recursion formulae analogous to formulae (8) and using the error signal $e_R(n)$, these coefficients practically adjust themselves in a manner such that after a sufficiently large number of iterations the following relations apply:

$$\begin{cases} C_R^1(n) = IRe[k_1 \cdot h(n)] \\ C_R^2(n) = IRe[k_2 h(n)] \\ \vdots \\ C_R^p(n) = IRe[k_p \cdot h(n)] \end{cases} \quad (19)$$

It then follows from formula (18) that the real error signal $e_R(n)$ has been cancelled. In practice, this is accomplished by using recursion formulae which are simpler to use and which are analogous to the formulae (9), in which the coefficients of the filters are real numbers and the error signal is real.

The echo canceler of the invention is therefore assembled from identical adaptive digital filters 16-1 to 16-p having real coefficients adjusted on the basis of a real error signal. So it is not necessary to use hereinafter the index R to indicate that the signal and the filter coefficients are real.

Figure 2:
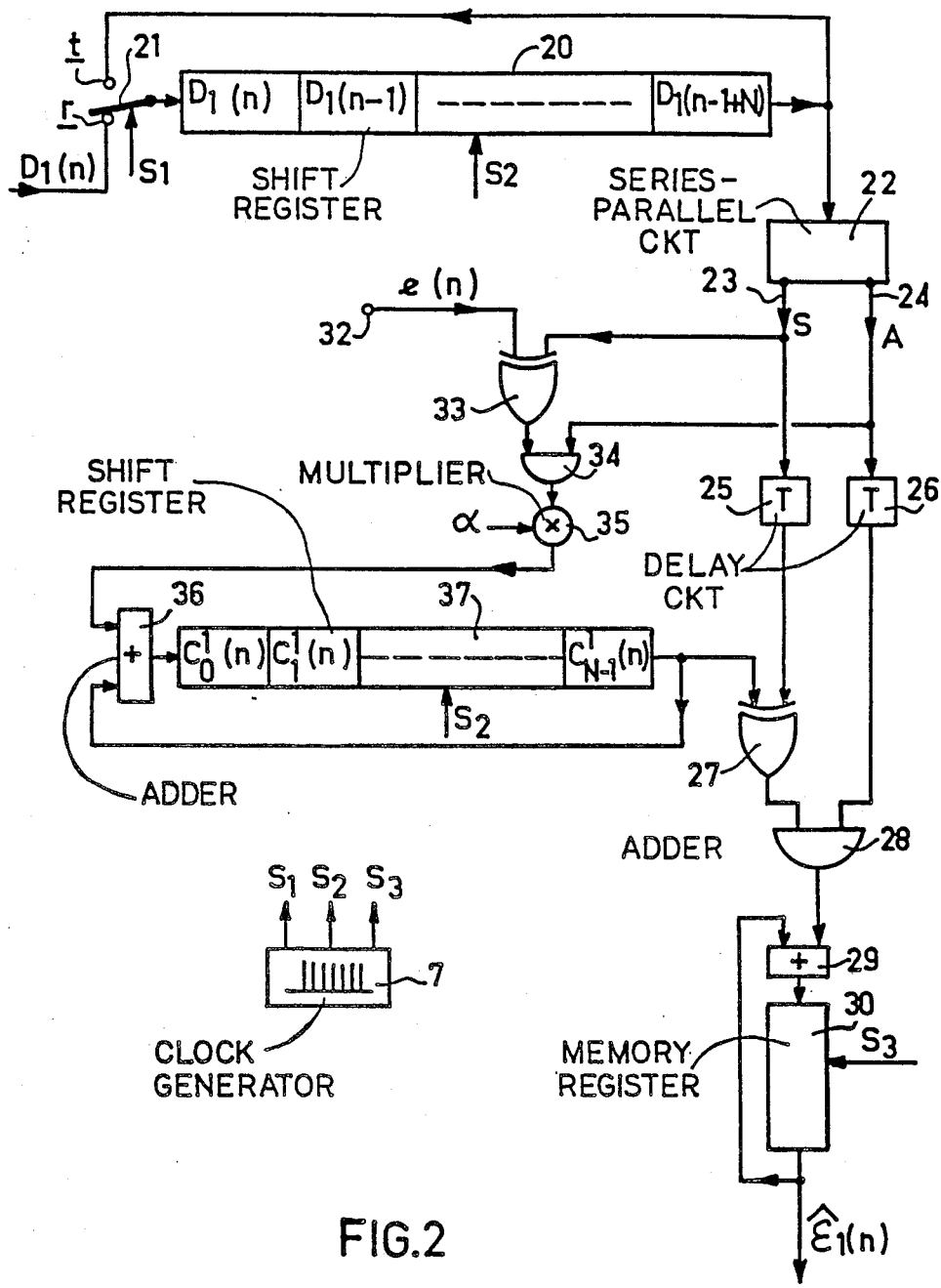
FIG. 2 shows the block diagram of an adaptive digital filter used in the echo canceler of FIG. 1.

FIG. 2 shows an embodiment of one of these filters, for example filter 16-1.

If the input numbers stored in this filter are denoted $D_1(n-q)$ and the coefficients of this filter are denoted $C_q^1(n)$ (where q is an integer between 0 and $N-1$), each output number $\hat{\epsilon}_1(n)$ must be calculated in accordance with the following expression, which is equivalent to the first formula of formulae (7):

$$\epsilon_1(n) = \sum_{q=0}^{N-1} D_1(n-1) \cdot C_q^1(n) \quad (20)$$

On the other hand, it follows from the first formula of formulae (9) that the N coefficients of this filter must be modified in accordance with the recursion formula:

$$C_q^1(n+1) = C_q^1(n) + \alpha e(n) D_1(n-q) \quad (21)$$

In FIG. 2 the numbers $+1$, $-1$ or 0 of the signal $D_1(n)$ to be processed by the filter are applied to a shift register 20 via a contact r of a two-position switch 21. This switch 21 is controlled by the pulses of frequency $1/T$ of a control signal $S_1$ produced by the clock generator 7. During a short period of time at the beginning of each period the switch 21 is set to the contact r in order to enter a number of the signal $D_1(n)$ into the register 21. The register 20 has N elements and, at the beginning of a period T corresponding to an instant n, it contains N numbers $D_1(n-q)$ of the signal $D_1(n)$. During the remaining time of each period T the switch 21 is set to its contact t which interconnects the output and the input of the shift register 20. The shift pulses of this register constitute a reference signal $S_2$. The frequency of these pulses is such that, when the input and the output of register are interconnected, the whole ensemble of the N numbers $D(n-q)$ circulates in the register as many times as samples of the error signal $e(n)$ occur during each period T. To simplify the explanation let it now first be assumed that one single sample $e(n)$ of the error signal occurs during a period T, so that during this period the N numbers $D_1(n-q)$ appear only once at the output of the register 20.

These numbers are applied to a series-parallel circuit 22 having two outputs 23 and 24. A bit S characterizing the sign of the numbers $D_1(n-q)$ appears at the output 23 and a bit A characterizing the amplitude which assumes only the value 1 or 0, appears at the output 24. The delay circuits 25 and 26 connected to the outputs 23 and 24 of the circuit 22 produce a delay T of the numbers $D_1(n-q)$ characterized by their sign bit S and their amplitude bit A. The sign bit S is applied to an input of an Exclusive-OR circuit 27. At the other input of this circuit 27 there appear, in synchronism with the numbers $D_1(n-q)$, the coefficients $C_q^1(n)$ obtained in a manner to be described hereinafter. Thus, Exclusive-OR circuit 27 effects multiplication of the coefficients $C_q^1(n)$ by $+1$ or $-1$, depending on the sign of the numbers $D_1(n-q)$. The output of Exclusive-OR circuit 27 is connected to the input of an AND-gate 28, whose other input receives the amplitude bit A of the numbers $D_1(n-q)$.

At the output of the AND-gate 28 there are obtained, one after the other during a period T, the N products $D_1(n-q).C_c^1(n)$ which appear in formula (20). The sum of these products permitting to obtain the output signal of the filter $\hat{e}_1(n)$ is produced by connecting the output of the AND-gate 28 to an adder 29 connected to a memory register 30 in such a manner that they form together an accumulator. This register reset to zero at a suitable instant in each period T by a signal $S_3$ supplies the signal $\hat{e}_1(n)$ in accordance with formula (20).

The N coefficients $C_q^1(n)$ used in each period T must be calculated in accordance with the recursion formula (21), which is used as follows. During the time T of the delay produced by the delay circuits 25 and 26, the sample e(n) of the error signal appearing at the terminal 32 is successively multiplied by the N numbers $D_1(n-q)$ having values $+1$, $-1$ or 0 which each appear at the output of the circuit 22 in the form of a sign bit S and an amplitude bit A. These multiplications are performed by means of an Exclusive-OR circuit 33 and an AND-gate 34 arranged in a manner similar to the arrangement of the circuits 27 and 28. The N products $e(n).D_1(n-q)$ thus obtained during a period T are multiplied in a circuit 35 by the coefficient $\alpha$ whose value is very low with respect to 1. By choosing a power of two as coefficient $\alpha$, this multiplication consists simply of a constant shift of the bits of the number to be multiplied. In this manner N modifying terms $\alpha.e(n).D_1(n-q)$ are obtained which are respectively added to the N coefficients $C_q^1(n)$ to obtain the N coefficients $C_q^1(n+1)$.

This addition is effected by means of an adder 36, one input of which is connected to the output of circuit 35 and the output of which is connected to the input of a shift register 37, the output of this shift register 37 being connected to the other input of the adder 36. The shift register 37 has N elements to store the N coefficients $C_q^1(n)$. The content of this register 37 is shifted by the same shift pulses forming the signal $S_2$ as the shift pulses shifting the content of the register 20. In this way the N coefficients $C_q^1(n)$ appearing at the output of the shift register 37 are simultaneously applied to the input of the Exclusive-OR circuit 27 and to the input of the adder 36 which produces at its output the N corresponding coefficients to be used in the subsequent period T.

As mentioned in the foregoing, it is necessary, to satisfy the Shannon theorem, for the error signal to be sampled several times during each period T. If M samples of the error signal occur during the period T, the N numbers $D_1(n-q)$ will circulate M times in the shift register 20 during a period T and the register 37 will include M'N elements to be able to store M'N coefficients. During a period T, M samples of the signal $\hat{e}_1(n)$ are then obtained at the output of the register 30.

It will be evident to a person skilled in the art that the output accumulator of the filter shown in FIG. 2 formed by the adder 29 and the memory register 30 may be in common for the p filters 16-1 to 16-p of the echo canceler, the adder 29 then performing the part of the adder 15 of FIG. 1.

Different embodiments of the invention will now be described for practical modulation methods. In addition to the advantages as regards simplicity and modular construction which are very apparent from the general description given so far, it will be evident that there are further advantages, particularly the automatic adaptation of the echo canceler to different types of modulation for which the transmitted carrier has the same number of modulation states, and also the simple adaptation of the echo canceler to the functioning of the modem at the fallback rate.

First, the modulation method having 8 states of the transmitted carrier will now be described, this modulation method being used in modems transmitting 4800 bits per second at a modulation rate of 1600 Baud. For this case the signal D(n) representative of the amplitude and the absolute phase of the carrier at the instants nT (where $1/T = 1600$ Hz) has 8 possible values.

In one type of modulation with 8 states, the transmitted carrier has one single amplitude and the carrier may assume 8 distinct phases with respect to a reference phase, one of these phases being zero and the other phases being multiples of 45°. The 8 possible states of the transmitted carrier are shown in customary manner in the diagram of FIG. 3 by 8 points $A_1$ to $A_8$ corresponding to an amplitude 1 and to the above-mentioned phases with respect to the reference axis Ox.

In a different type of modulation with 8 states, represented by the points $A_1$ to $A_8$ in the diagram of FIG. 4, the transmitted carrier may assume two amplitudes and 8 phases. The points $A_1$ to $A_8$ correspond to the same phases of the carrier as in the diagram of FIG. 3. The points $A_1$, $A_2$, $A_5$, $A_6$ correspond to an amplitude 1 and the points $A_3$, $A_4$, $A_7$, $A_8$ correspond to an amplitude $\sqrt{2/2}$.

Finally, the type of modulation with 8 states shown in the diagram of FIG. 5 differs from the type shown in the diagram of FIG. 4 in the fact that the points $A_3$, $A_4$, $A_7$, $A_8$ correspond to an amplitude $\sqrt{\frac{2}{3}}$.

With the concept of the echo canceler of the invention, one and the same echo canceler can be suitable for use for the three types of modulation with 8 states and, generally, for other types of modulation with 8 states.

In one given embodiment of the invention, use is made of a code conversion circuit 17 in the echo canceler which causes the 8 possible values of the signal D(n), that is to say the 8 states of the carrier represented by the points $A_1$ to $A_8$, to correspond with values of 4 signals $D_1(n)$, $D_2(n)$, $D_3(n)$, $D_4(n)$ in accordance with the following Table I.

TABLE I

| D(n) | $A_1$ | $A_2$ | $A_3$ | $A_4$ | $A_5$ | $A_6$ | $A_7$ | $A_8$ |
|---|---|---|---|---|---|---|---|---|
| $D_1(n)$ | +1 | 0 | 0 | 0 | −1 | 0 | 0 | 0 |
| $D_2(n)$ | 0 | +1 | 0 | 0 | 0 | −1 | 0 | 0 |
| $D_3(n)$ | 0 | 0 | +1 | 0 | 0 | 0 | −1 | 0 |
| $D_4(n)$ | 0 | 0 | 0 | +1 | 0 | 0 | 0 | −1 |

In accordance with the above described concept in general form, the code conversion of Table I causes four elementary signals $D_1(n)$ to $D_4(n)$ assuming values $+1$, $-1$ or 0 to correspond with the signal D(n). These four signals satisfy the condition of instantaneous independence as expressed in formula (17), as the products of two of the signals $D_1(n)$ to $D_4(n)$ are always zero, irrespective of the state of the carrier occurring at the instant n.

For the case of modulation with 8 states as shown in the diagram of FIG. 3, the code conversion of Table I can be expressed by the following resolution formula of the signal D(n):

$$D(n) = D_1(n) + j D_2(n) + \frac{1+j}{\sqrt{2}} D_3(n) +$$

$$\frac{1-j}{\sqrt{2}} D_4(n)$$

This formula can be easily verified in the diagram of FIG. 3 whose axes Ox and Oy permit of representing the real and the imaginary parts of complex numbers.

This formula corresponds to the general resolution formula (6), but now limited to four terms having the factors:

$$k_1 = 1 \quad k_2 = j \quad k_3 = \frac{1+j}{\sqrt{2}} \quad k_4 = \frac{1-j}{\sqrt{2}}$$

For the case of modulation with 8 states as shown in the diagram of FIG. 4, the code conversion of Table I can be expressed by the resolution formula:

$$D(n) = D_1(n) + j D_2(n) + \frac{1+j}{2} D_3(n) + \frac{1-j}{2} D_4(n)$$

Finally, for the case of modulation with 8 states as shown in the diagram of FIG. 5, the code conversion of Table I can be expressed by the formula:

$$D(n) = D_1(n) + j D_2(n) + \frac{1+j}{3} D_3(n) + \frac{1-j}{3} D_4(n)$$

The four factors $k_1$, $k_2$, $k_3$, $k_4$ which correspond to these two last-mentioned formulae can be easily derived therefrom.

An echo canceler suitable for a modulation with 8 states and based on the code conversion of Table I then comprises, as shown in FIG. 6, a synthetic echo signal generator 14 provided with a code conversion circuit 17 which, in accordance with Table I forms four signals $D_1(n)$ to $D_4(n)$ starting from the signal D(n). As explained in the foregoing, these signals are processed in four adaptive filters 16-1 to 16-4 receiving the same error signal e(n). The synthetic echo signal $\hat{e}$(n) is obtained by forming the sum of the output signals of the four filters by means of the adder 15. The code conversion circuit 17 can then, for example, be realised by means of a memory which contains the 8 possible configurations of the ensemble of the signals $D_1(n)$ to $D_4(n)$ and which is read by the signal D(n) in a manner such that the four signals $D_1(n)$ to $D_4(n)$ appear separately.

For the three types of modulation represented by the diagrams of FIGS. 3, 4 and 5 it is achieved, after a certain number of iterations for modifying the coefficients of the filters, that the error signal e(n), that is to say the echo, is substantially cancelled. In accordance with an interpretation given in the foregoing, it may be assumed that when the echo cancellation has been realized, the signals $D_1(n)$ to $D_4(n)$ having values +1, −1 or 0 have automatically been multiplied in the filters 16-1 to 16-4 by the real or complex factors $k_1$ to $k_4$, these factors being different for the three types of modulation and having the above-mentioned values.

Without any modification, the same echo canceler is suitable for other types of modulation with 8 states, for example a type of modulation as shown in the diagram of FIG. 7 and obtained by shifting the diagram of FIG. 4 through an angle θ which may be equal to 22.5°. Also here the echo cancellation is effected with the echo canceler based on the code conversion of the Table I, the multiplication of the signals $D_1(n)$ to $D_4(n)$ by the factors $k_1$ to $k_4$ which particularly depend on the angle θ, being automatically performed in the filters 16-1 to 16-4.

A different embodiment of the echo canceler of the invention which is also suitable for modulation with 8 states of the transmitted carrier, but in which the independence of the elementary resolution signals of the signal D(n) is realized in the mean only, will now be described. For this embodiment, for example a circuit 17 can be used performing a code conversion in accordance with the following Table II.

TABLE II

| D(n) | $A_1$ | $A_2$ | $A_3$ | $A_4$ | $A_5$ | $A_6$ | $A_7$ | $A_8$ |
|---|---|---|---|---|---|---|---|---|
| $D_1(n)$ | +1 | 0 | 0 | 0 | −1 | 0 | 0 | 0 |
| $D_2(n)$ | 0 | +1 | 0 | 0 | 0 | −1 | 0 | 0 |
| $D_3(n)$ | 0 | 0 | +1 | +1 | 0 | 0 | −1 | −1 |
| $D_4(n)$ | 0 | 0 | +1 | −1 | 0 | 0 | −1 | +1 |

It appears that with this code conversion the products of two of the signals $D_1(n)$ to $D_4(n)$ are generally zero, except for the product $D_3(n); D_4(n)$ which is not equal to zero for the states $A_3$, $A_4$, $A_7$ and $A_8$. However, since on the one hand these states are equiprobable and on the other hand the product $D_3(n); D_4(n)$ is equal to +1 for two of these states ($A_3$ and $A_7$) and equal to −1 for the two other states ($A_4$ and $A_8$), it is certain that this product $D_3(n); D_4(n)$ is zero in the mean so that the condition of independence in the mean expressed by formula (5A) is satisfied.

An echo canceler of the invention suitable for a modulation with 8 states and using a code conversion in accordance with Table II is, with the exception of the code conversion circuit 17, exactly identical to the echo canceler using the code conversion in accordance with Table I. In particular, the circuit diagram of the generator 14 for the synthetic echo signal is the circuit diagram of FIG. 6. The same echo canceler can be used without any modification for the four types of modulation shown in FIGS. 3, 4, 5 and 7. Compared with an echo canceler using the code conversion in accordance with the Table I an echo canceler using a code conversion in accordance with Table II has the drawback that in practice the cancellation of the echo signal requires more time.

For the modulation case shown in the diagram of FIG. 3 the code conversion in accordance with Table II can be expressed by the following resolution formula for the signal D(n);

$$D(n) = D_1(n) + j D_2(n) + \frac{1}{\sqrt{2}} D_3(n) + \frac{j}{\sqrt{2}} D_4(n)$$

For the modulation case shown in the diagram of FIG. 4 the resolution formula for the signal D(n) becomes:

$$D(n) = D_1(n) + jD_2(n) + \tfrac{1}{2}D_3(n) + j/2D_4(n)$$

For the modulation case shown in the diagram of FIG. 5 the resolution formula for the signal D(n) is:

$$D(n) = D_1(n) + jD_2(n) + \tfrac{1}{3}D_3(n) + j/3D_4(n)$$

For the modulation case shown in the diagram of FIG. 7 it is possible to formulate a similar resolution formula in which the factors $k_1$ to $k_4$ are functions of the angle θ.

Also here it holds that, for each type of modulation with 8 states, in the four filters 16-1 to 16-4 of the echo canceler processing the respective signals $D_1(n)$ to $D_4(n)$ having values +1, −1 or 0, the coefficients adjust themselves such that they automatically provide multiplication of these inputs signals $D_1(n)$ to $D_4(n)$ by the factors $k_1$ to $k_4$, respectively.

It is here necessary to stress, on the basis of these examples, the difference in concept between the echo canceler described in the above-mentioned U.S. Pat. No. 4,162,378 and the echo canceler of the present invention. In the version which is closest to the present invention, the prior art echo canceler utilizes a number of filters corresponding to the number of phase states of the carrier, and in each modulation period a number corresponding to the amplitude of the carrier is applied to the input of one single filter, the number 0 being applied to all the other filters. This concept corresponds to a code conversion of the type of Table I with instantaneous independence of the elementary signals and are obtained by forming a sum of two carriers in quadrature, each modulated as a function of the data by the phases 0° and 180° and by the amplitudes 1 and 3. The transmit path 1 of the modem can then be realized by means of two modulation systems analogous to that of FIG. 1 and respectively producing two quadrature carriers whose phase and amplitude are modulated. In accordance with this concept, the signal $D(n)$ representing the modulation state of the transmitted carrier and to be applied to the echo canceler is formed by the ensemble of the signals representing the amplitude and the absolute phase of the two quadrature carriers.

The present invention makes it possible to avoid in the echo canceler an actual performance of a multiplication by the number 3 representing a possible amplitude of the two quadrature carriers. To this end, use can be made of a circuit 17 effectuating a code conversion in accordance with Table III and corresponding to a resolution of the signal $D(n)$ into 8 elementary signals $D_1(n)$ to $D_8(n)$.

TABLE III

| $D(n)$ | $A_1$ | $A_2$ | $A_3$ | $A_4$ | $A_5$ | $A_6$ | $A_7$ | $A_8$ | $A_9$ | $A_{10}$ | $A_{11}$ | $A_{12}$ | $A_{13}$ | $A_{14}$ | $A_{15}$ | $A_{16}$ |
|---|---|---|---|---|---|---|---|---|---|---|---|---|---|---|---|---|
| $D_1(n)$ | 1 | 0 | 0 | 0 | 0 | 0 | 0 | 0 | −1 | 0 | 0 | 0 | 0 | 0 | 0 | 0 |
| $D_2(n)$ | 0 | 1 | 0 | 0 | 0 | 0 | 0 | 0 | 0 | −1 | 0 | 0 | 0 | 0 | 0 | 0 |
| $D_3(n)$ | 0 | 0 | 1 | 0 | 0 | 0 | 0 | 0 | 0 | 0 | −1 | 0 | 0 | 0 | 0 | 0 |
| $D_4(n)$ | 0 | 0 | 0 | 1 | 0 | 0 | 0 | 0 | 0 | 0 | 0 | −1 | 0 | 0 | 0 | 0 |
| $D_5(n)$ | 0 | 0 | 0 | 0 | 1 | 0 | 0 | 0 | 0 | 0 | 0 | 0 | −1 | 0 | 0 | 0 |
| $D_6(n)$ | 0 | 0 | 0 | 0 | 0 | 1 | 0 | 0 | 0 | 0 | 0 | 0 | 0 | −1 | 0 | 0 |
| $D_7(n)$ | 0 | 0 | 0 | 0 | 0 | 0 | 1 | 0 | 0 | 0 | 0 | 0 | 0 | 0 | −1 | 0 |
| $D_8(n)$ | 0 | 0 | 0 | 0 | 0 | 0 | 0 | 1 | 0 | 0 | 0 | 0 | 0 | 0 | 0 | −1 | does not correspond to a code conversion of the type of Table II, in which several filters can simultaneously receive signals unequal to zero and in which only an independence of the elementary signals in the mean is obtained. On the other hand, however, the prior echo canceler only then achieves the same result as the echo canceler of the present invention using a code conversion of the type of Table I, when use is made of a modulation method having one amplitude level only, for example the modulation method shown in FIG. 3. In contradistinction therewith, it would be a requirement for modulation methods having different amplitude levels, such as those shown in FIGS. 4, 5 and 6, to actually perform in the prior art echo canceler multiplications by numbers corresponding with these amplitude levels, for example by the numbers $\pm 1/\sqrt{2}$ in the case of the modulation method shown in FIGS. 4 and 6 and by the numbers $\pm\sqrt{\frac{2}{3}}$ in the case of the modulation method shown in FIG. 5. It is just the echo canceler of the present invention which makes it possible to avoid these complicated multiplications, so that indeed in all modulation cases only multiplication by numbers having values +1, −1 or 0 need be performed.

Figure 8:
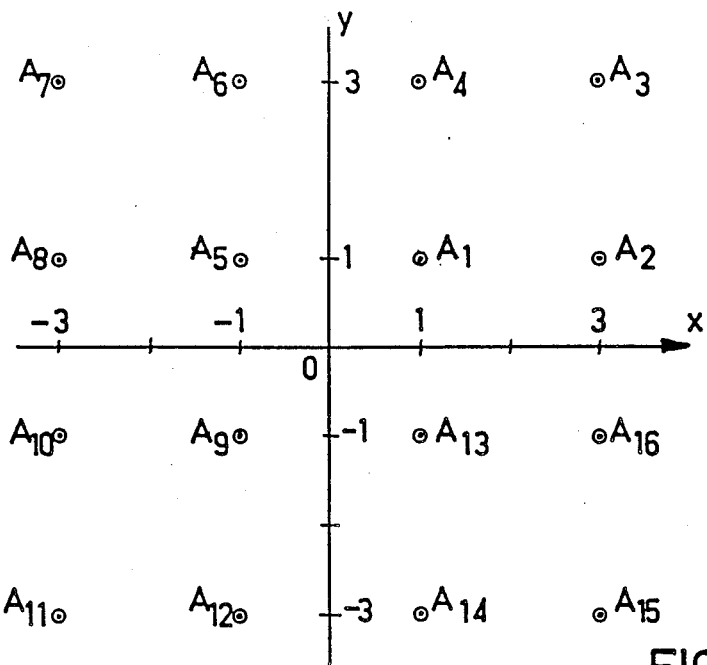
FIG. 8 is a signal space diagram for a modulation type having 16 states.

By way of example, two embodiments of an echo canceler for a modulation method using 16 states of the carrier and utilized in modems transmitting 9600 bits per second at a modulation rate of 2400 Baud will now be described. A type of modulation with 16 states used in practice is shown in the diagram of FIG. 8. In this case, the 16 modulation states of the transmitted carrier A circuit 17 realizing the code conversion in accordance with Table III produces 8 elementary signals $D_1(n)$ to $D_8(n)$ which are instantaneously independent, as for each modulation state of the carrier only one of these signals is not equal to zero. The echo canceler indeed comprises 8 filters 16-1 to 16-8, but has the advantage of a short convergence time.

In accordance with a different embodiment of the invention, it is also possible to effectuate a code conversion in accordance with Table IV and corresponding to a resolution of the signal $D_1(n)$ into 4 elementary signals $D_1(n)$ to $D_4(n)$.

TABLE IV

| $D(n)$ | $A_1$ | $A_2$ | $A_3$ | $A_4$ | $A_5$ | $A_6$ | $A_7$ | $A_8$ | $A_9$ | $A_{10}$ | $A_{11}$ | $A_{12}$ | $A_{13}$ | $A_{14}$ | $A_{15}$ | $A_{16}$ |
|---|---|---|---|---|---|---|---|---|---|---|---|---|---|---|---|---|
| $D_1(n)$ | 1 | 0 | 0 | 1 | −1 | 0 | 0 | −1 | −1 | 0 | 0 | −1 | 1 | 0 | 0 | 1 |
| $D_2(n)$ | 1 | 1 | 0 | 0 | 1 | 1 | 0 | 0 | −1 | −1 | 0 | 0 | −1 | −1 | 0 | 0 |
| $D_3(n)$ | 0 | 1 | 1 | 0 | 0 | −1 | −1 | 0 | 0 | −1 | −1 | 0 | 0 | 1 | 1 | 0 |
| $D_4(n)$ | 0 | 0 | 1 | 1 | 0 | 0 | 1 | 1 | 0 | 0 | −1 | −1 | 0 | 0 | −1 | −1 |

A circuit 17 realizing the code conversion in accordance with Table IV produces 4 signals $D_1(n)$ to $D_4(n)$ which are independent in the mean. For each modulation state a product of two of these four signals is indeed unequal to zero. However, for the 16 modulation states together, 8 of these products unequal to zero have the value +1 and the 8 other products have the value −1. As the 16 modulation states are equiprobable, the condition of independence in the mean as expressed by formula (5A) is yet satisfied. The echo canceler comprises only four filters 16-1 to 16-4 at the cost of a rather long convergence time.

The modular concept of the echo canceler of the invention offers a very interesting possibility as regards functioning of the modem at a reduced transmission rate, usually denoted as fall-back rate. It is known that when the transmission conditions are poor and thus at a normal transmission rate entail unacceptable errors at the receiver side, the transmitter of the modem is adapted such that the data are transmitted at the fall-back rate, which generally is equal to half the normal rate. An echo canceler associated with the modem must then also be adapted to the fall-back rate. With the echo canceler of the invention it is possible to obtain in a very simple way better performances during functioning of the modem at the fall-back rate.

This possibility will now be further described for the case, given by way of example, of a modem using for the normal rate of 9600 bits per second a modulation of the carrier with 16 states in accordance with the diagram of FIG. 8. Let it be assumed that, when operating with the fall-back rate of 4800 bits per second, the 8 carrier states used are the states denoted in FIG. 7 by $A_2, A_4, A_6, A_8, A_{10}, A_{12}, A_{14}$ and $A_{16}$. For the normal rate of 9600 bits per second the echo canceler uses a code conversion circuit 17 effectuating a code conversion in accordance with Table III and producing 8 signals $D_1(n)$ to $D_8(n)$ which, as described in the foregoing, are applied to the input of 8 filters 16-1 to 16-8. During operation at the fall-back rate, the four signals $D_1(n), D_3(n), D_5(n), D_7(n)$ are not used and the four remaining signals $D_2(n), D_4(n), D_6(n), D_8(n)$ are obtained as a function of the 8 states used as shown in Table V which is a simple extract of Table III.

TABLE V

| D(n)   | $A_2$ | $A_4$ | $A_6$ | $A_8$ | $A_{10}$ | $A_{12}$ | $A_{14}$ | $A_{16}$ |
|--------|-------|-------|-------|-------|----------|----------|----------|----------|
| $D_2(n)$ | 1     | 0     | 0     | 0     | $-1$     | 0        | 0        | 0        |
| $D_4(n)$ | 0     | 1     | 0     | 0     | 0        | $-1$     | 0        | 0        |
| $D_6(n)$ | 0     | 0     | 1     | 0     | 0        | 0        | $-1$     | 0        |
| $D_8(n)$ | 0     | 0     | 0     | 1     | 0        | 0        | 0        | $-1$     |

Figure 9:
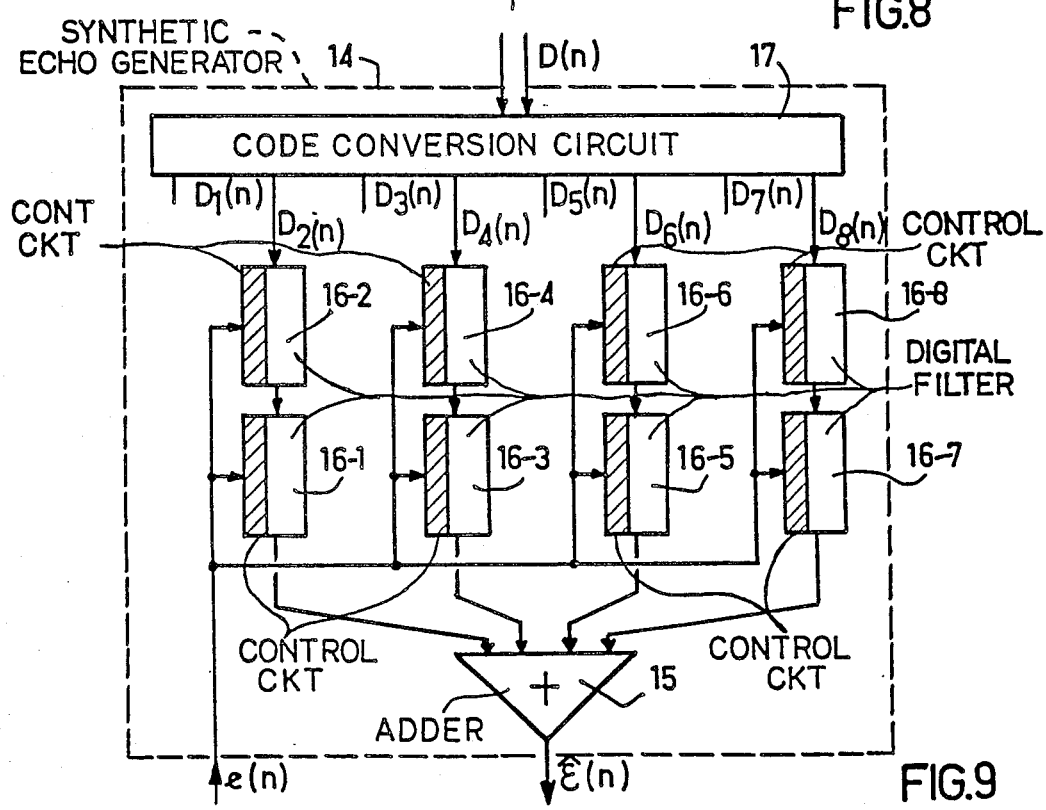
FIG. 9 illustrates the connections ("branching") made to adapt an echo canceler to the fall-back rate in the case that a 16-state modulation is used at the normal rate and an 8-state modulation at the fall-back rate.

These signals satisfy the condition of independence required for the echo canceler of the invention. FIG. 9 shows the configuration of the synthetic echo signal generator 14 which can be advantageously realized during functioning at the fall-back rate. Instead of using only the filters 16-2, 16-4, 16-6, 16-8 to which the signal $D_2(n), D_4(n), D_6(n), D_8(n)$ are applied for forming the synthetic echo signal $\hat{e}(n)$, these filters are arranged in series with the four filters 16-1, 16-3, 16-5, 16-7 which, at the normal rate, are used for processing the signals $D_1(n), D_3(n), D_5(n), D_7(n)$. Acting thus, the length of the filters processing the four signals produced by the code conversion circuit 17 is doubled and the performances of the echo canceler at the fall-back rate thus increase.

In the light of the various examples described it will be clear to a person skilled in the art that for each type of modulation there are several code conversions permitting to obtain elementary signals which only assume the values +1, −1 or 0 and which are mutually independent in the mean. It should be noted that by means of code conversions which are suitable for certain types of modulation, elementary signals can be obtained which are independent in the mean and assume only two values +1 or −1. Finally, in other modulation cases the numbers ±1 produced by the code conversion circuit for given modulation states can be replaced by integral powers of two, such as ½, ¼. . . etc. which in practice does not make the multiplications to be performed in the filters of the echo canceler more complicated.

What is claimed is:

1. An echo canceller associated with a data transmission modem, the modem utilizing amplitude and phase modulation, the modem including a transmit path and a receive path, such that an undesired echo signal appears in the receive path resulting from a carrier signal in the transmit path, the carrier signal having a phase and amplitude state at each modulation interval, the modem producing a predetermined number of different phase and amplitude states for functioning at a normal rate and half of the predetermined number of different states for functioning at a fall-back rate, the echo canceller comprising:

(a) first input means coupled to the transmit path for receiving a digital representation of the carrier signal, the representation indicating for each modulation interval the phase and amplitude state of the carrier signal;
   (b) code conversion means coupled to receive the representation and having a plurality of parallel outputs, each of the parallel outputs providing one of the values +1, −1, and 0, so that the parallel outputs together provide distinct configurations $D_i(n)$ corresponding to the phase and amplitude states of the carrier signal, said distinct configurations satisfying the equation:

$$E[D_i(n) \cdot D_{i'}(n)] = 0$$

where: the operator E represents mathematical expectation; n is an integer representing an instant of time; i and i' represent respective parallel outputs of the code conversion means and are integers between 1 and a number of the parallel outputs; $i \neq i'$; and $D_i(n)$ and $D_{i'}(n)$, are the values provided at the respective parallel outputs, said code conversion means producing 2P distinct configurations satisfying the equation for operation at said normal rate, and P of said 2P distinct configurations also satisfying the equation for operation at said fall-back rate;
   (c) output means, coupled to the receive path, for providing an analog synthetic echo signal;
   (d) means, disposed within the receive path, for subtractively combining the analog synthetic echo signal and the undesired echo signal to produce a residual echo signal therefrom;
   (e) second input means coupled to the receive path, for supplying a digital representation of the residual echo signal; and
   (f) a plurality of adaptive filters, coupled to receive the distinct configurations from respective ones of the parallel outputs of the code conversion means and to receive the digital representation of the residual echo signal from the second input means, having respective outputs coupled with the output means of the echo canceller, and having coefficients which are adjusted in an interactive manner in order to minimize the mean square value of the residual echo signal.

2. The echo canceller of claim 1 wherein:
   a number of said adaptive filters is also 2P, each of said 2P adaptive filters being identical to a base filter and each being coupled to receive one of the values of each of the 2P distinct configurations for functioning at said normal rate, said adaptive filters being reconfigured for functioning at said fall-back rate so that each value of said P of said 2P distinct configurations is applied to a cascade connection of two base filters.

3. An echo canceller as claimed in claim 1 wherein the modem produces pairs of possible phase and amplitude states of the carrier, each pair corresponding to the same amplitude and to two phases differing by 180°, characterized in that said code conversion means is arranged to produce the distinct configurations for each pair of states such that the values provided at corresponding parallel outputs are of opposite sign.

4. The echo canceller of claim 3 wherein:
a number of said adaptive filters is P, each of said P adaptive filters being identical to a base filter and each being coupled to receive one of the values of each of the 2P distinct configurations for functioning at said normal rate, said adaptive filters being reconfigured for functioning at said fall-back rate so that each value of said P of said 2P distinct configurations is applied to a cascade connection of two base filters.

5. The echo canceller of claim 4 wherein:
a. the representation of the carrier signal corresponds to a signal space having sixteen points $A_1$, $A_2$, $A_3$, $A_4$, $A_5$, $A_6$, $A_7$, $A_8$, $A_9$, $A_{10}$, $A_{11}$, $A_{12}$, $A_{13}$, $A_{14}$, $A_{15}$, and $A_{16}$;
b. P=8; and
c. the code conversion means produces the distinct configurations according to the following first table for functioning at the normal rate:

| D(n) | $A_1$ | $A_2$ | $A_3$ | $A_4$ | $A_5$ | $A_6$ | $A_7$ | $A_8$ | $A_9$ | $A_{10}$ | $A_{11}$ | $A_{12}$ | $A_{13}$ | $A_{14}$ | $A_{15}$ | $A_{16}$ |
|---|---|---|---|---|---|---|---|---|---|---|---|---|---|---|---|---|
| $D_1(n)$ | 1 | 0 | 0 | 0 | 0 | 0 | 0 | 0 | −1 | 0 | 0 | 0 | 0 | 0 | 0 | 0 |
| $D_2(n)$ | 0 | 1 | 0 | 0 | 0 | 0 | 0 | 0 | 0 | −1 | 0 | 0 | 0 | 0 | 0 | 0 |
| $D_3(n)$ | 0 | 0 | 1 | 0 | 0 | 0 | 0 | 0 | 0 | 0 | −1 | 0 | 0 | 0 | 0 | 0 |
| $D_4(n)$ | 0 | 0 | 0 | 1 | 0 | 0 | 0 | 0 | 0 | 0 | 0 | −1 | 0 | 0 | 0 | 0 |
| $D_5(n)$ | 0 | 0 | 0 | 0 | 1 | 0 | 0 | 0 | 0 | 0 | 0 | 0 | −1 | 0 | 0 | 0 |
| $D_6(n)$ | 0 | 0 | 0 | 0 | 0 | 1 | 0 | 0 | 0 | 0 | 0 | 0 | 0 | −1 | 0 | 0 |
| $D_7(n)$ | 0 | 0 | 0 | 0 | 0 | 0 | 1 | 0 | 0 | 0 | 0 | 0 | 0 | 0 | −1 | 0 |
| $D_8(n)$ | 0 | 0 | 0 | 0 | 0 | 0 | 0 | 1 | 0 | 0 | 0 | 0 | 0 | 0 | 0 | −1 | and according to the following second table for functioning at the fallback rate:

| D(n) | $A_2$ | $A_4$ | $A_6$ | $A_8$ | $A_{10}$ | $A_{12}$ | $A_{14}$ | $A_{16}$ |
|---|---|---|---|---|---|---|---|---|
| $D_2(n)$ | 1 | 0 | 0 | 0 | −1 | 0 | 0 | 0 |
| $D_4(n)$ | 0 | 1 | 0 | 0 | 0 | −1 | 0 | 0 |
| $D_6(n)$ | 0 | 0 | 1 | 0 | 0 | 0 | −1 | 0 |
| $D_8(n)$ | 0 | 0 | 0 | 1 | 0 | 0 | 0 | −1 |

6. An echo canceler as claimed in claim 1, characterized in that all adaptive filters are identical to a base transversal filter arranged for processing an input signal D(n) which assumes the value +1, −1 or 0 at the instants nT, where n is an integer with $-\infty < n < \infty$ and T is the modulation interval, the output values ê(n) of this base filter at the instants nT being calculated in accordance with the expression $$\epsilon(n) = \sum_{q=0}^{n-1} D(n-q)C_q(n), \text{ in which the } N$$

coefficients $C_q$ of this base transversal filter are adjusted in accordance with the recursion formula $$C_q(n+1) = C_q^i(n) + \alpha e(n)D(n-q)$$

where $\alpha$ is a coefficient small with respect to 1 and e(n) is a digital representation of the residual echo signal at the instant nT.

7. An echo canceller associated with a data transmission modem, the modem utilizing amplitude and phase modulation, the modem including a transmit path and a receive path, such that an undesired echo signal appears in the receive path resulting from a carrier signal in the transmit path, the carrier signal having a phase and amplitude state at each modulation interval, the modem producing a predetermined number of different phase and amplitude states for functioning at a normal rate and half of the predetermined number of different states for functioning at a fall-back rate, the echo canceller comprising:

(a) first input means coupled to the transmit path for receiving a digital representation of the carrier signal, the representation indicating for each modulation interval the phase and amplitude state of the carrier signal;

(b) code conversion means coupled to receive the representation and having a plurality of parallel outputs, each of the parallel outputs providing one of the values +1, −1, and 0, so that the parallel outputs together provide distinct configurations $D_i(n)$ corresponding to the phase and amplitude states of the carrier signal, said distinct configurations satisfying the equation:

$$E[D_i(n-q).D_{i'}(n-q')]=0$$

where: the operator E represents mathematical expectation; n is an integer representing an instant of time; i and i' represent respective parallel outputs of the code conversion means and are integers between 1 and a number of the parallel outputs; i≠i'; q and q' are integers between 1 and the number of the parallel outputs; and $D_i(n)$ and $D_{i'}(n)$ are the values provided at the respective parallel outputs, said code conversion means producing 2P distinct configurations satisfying the equation for operation at said normal rate, and P of said 2P distinct configurations also satisfying the equation for operation at said fall-back rate;

(c) output means, coupled to the receive path, for providing an analog synthetic echo signal;

(d) means, disposed within the receive path for subtractively combining the analog synthetic echo signal and the undesired echo signal to produce a residual echo signal therefrom;

(e) second input means, coupled to the receive path for supplying a digital representation of the residual echo signal; and (f) a plurality of adaptive filters, coupled to receive the distinct configurations from respective ones of the parallel outputs of the code conversion means and to receive the digital representation of the residual echo signal from the second input means, having respective outputs coupled with the output means of the echo canceller, and having coefficients which are adjusted in an interactive manner in order to minimize the mean square value of the residual echo signal.

8. The echo canceller of claim 7 wherein:
a number of said adaptive filters is also 2P, each of said 2P adaptive filters being identical to a base filter and each being coupled to receive one of the values of each of the 2P distinct configurations for functioning at said normal rate, said adaptive filters being reconfigured for functioning at said fall-back rate so that each value of said P of said 2P distinct configurations is applied to a cascade connection of two base filters.

9. An echo canceller as claimed in claim 7 wherein the modem produces pairs of possible phase and amplitude states of the carrier, each pair corresponding to the same amplitude and to two phases differing by 180°, characterized in that said code conversion means is arranged to produce the distinct configurations for each pair of states such that the values provided at corresponding parallel outputs are of opposite sign.

10. The echo canceller of claim 9 wherein:
a number of said adaptive filters is P, each of said P adaptive filters being identical to a base filter and each being coupled to receive one of the values of each of the 2P distinct configurations for functioning at said normal rate, said adaptive filters being reconfigured for functioning at said fall-back rate so that each value of said P of said 2P distinct configurations is applied to a cascade connection of two base filters.

11. The echo canceller of claim 10 wherein:
a. the representation of the carrier signal corresponds to a signal space having sixteen points $A_1$, $A_2$, $A_3$, $A_4$, $A_5$, $A_6$, $A_7$, $A_8$, $A_9$, $A_{10}$, $A_{11}$, $A_{12}$, $A_{13}$, $A_{14}$, $A_{15}$, and $A_{16}$;
b. P=8; and
c. the code conversion means produces the distinct configurations according to the following first table for functioning at the normal rate:

| $D(n)$ | $A_1$ | $A_2$ | $A_3$ | $A_4$ | $A_5$ | $A_6$ | $A_7$ | $A_8$ | $A_9$ | $A_{10}$ | $A_{11}$ | $A_{12}$ | $A_{13}$ | $A_{14}$ | $A_{15}$ | $A_{16}$ |
|---|---|---|---|---|---|---|---|---|---|---|---|---|---|---|---|---|
| $D_1(n)$ | 1 | 0 | 0 | 0 | 0 | 0 | 0 | 0 | −1 | 0 | 0 | 0 | 0 | 0 | 0 | 0 |
| $D_2(n)$ | 0 | 1 | 0 | 0 | 0 | 0 | 0 | 0 | 0 | −1 | 0 | 0 | 0 | 0 | 0 | 0 |
| $D_3(n)$ | 0 | 0 | 1 | 0 | 0 | 0 | 0 | 0 | 0 | 0 | −1 | 0 | 0 | 0 | 0 | 0 |
| $D_4(n)$ | 0 | 0 | 0 | 1 | 0 | 0 | 0 | 0 | 0 | 0 | 0 | −1 | 0 | 0 | 0 | 0 |
| $D_5(n)$ | 0 | 0 | 0 | 0 | 1 | 0 | 0 | 0 | 0 | 0 | 0 | 0 | −1 | 0 | 0 | 0 |
| $D_6(n)$ | 0 | 0 | 0 | 0 | 0 | 1 | 0 | 0 | 0 | 0 | 0 | 0 | 0 | −1 | 0 | 0 |
| $D_7(n)$ | 0 | 0 | 0 | 0 | 0 | 0 | 1 | 0 | 0 | 0 | 0 | 0 | 0 | 0 | −1 | 0 |
| $D_8(n)$ | 0 | 0 | 0 | 0 | 0 | 0 | 0 | 1 | 0 | 0 | 0 | 0 | 0 | 0 | 0 | −1 | and according to the following second table for functioning at the fallback rate:

| $D(n)$ | $A_2$ | $A_4$ | $A_6$ | $A_8$ | $A_{10}$ | $A_{12}$ | $A_{14}$ | $A_{16}$ |
|---|---|---|---|---|---|---|---|---|
| $D_2(n)$ | 1 | 0 | 0 | 0 | −1 | 0 | 0 | 0 |
| $D_4(n)$ | 0 | 1 | 0 | 0 | 0 | −1 | 0 | 0 |
| $D_6(n)$ | 0 | 0 | 1 | 0 | 0 | 0 | −1 | 0 |
| $D_8(n)$ | 0 | 0 | 0 | 1 | 0 | 0 | 0 | −1 |

12. An echo canceler as claimed in claim 7, characterized in that all adaptive filters are identical to a base transversal filter arranged for processing an input signal $D(n)$ which assumes the value +1, −1 or 0 at the instants nT, where n is an integer with $-\infty > n > \infty$ and T is the modulation interval, the output values $\epsilon(n)$ of this base filter at the instants nT being calculated in accordance with the expression $$\epsilon(n) = \sum_{q=0}^{n-1} D(n-q)C_q(n), \text{ in which the } N$$

coefficients $C_q$ of this base transversal filter are adjusted in accordance with the recursion formula $$C_q(n+1) = C_q^i(n) + \alpha e(n) D(n-q)$$

where $\alpha$ is a coefficient small with respect to 1 and $e(n)$ is a digital representation of the residual echo signal at the instant nT.

* * * * *